UNITED STATES PATENT OFFICE.

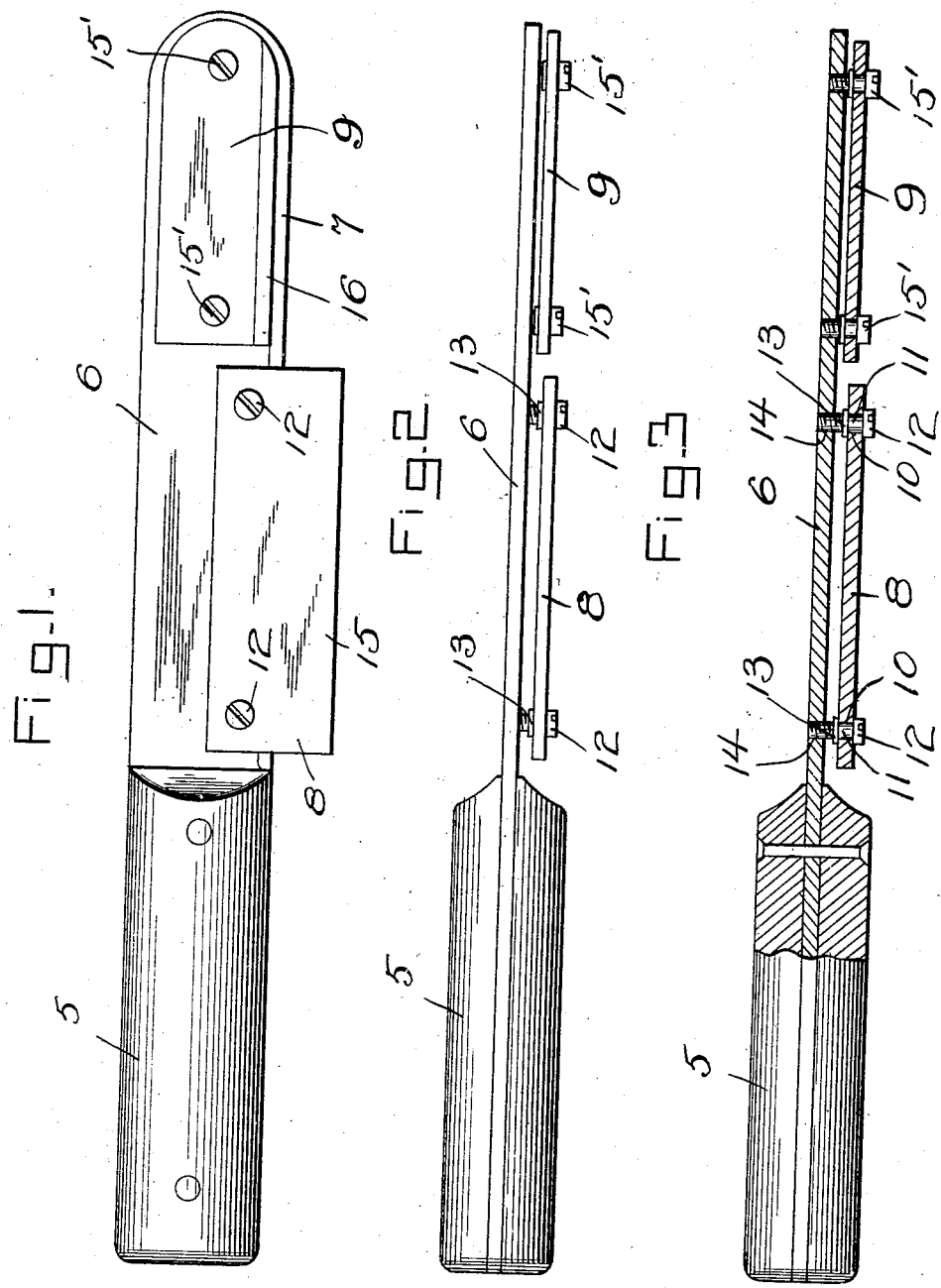

THOMAS F. BURK, OF PROVIDENCE, RHODE ISLAND.

KNIFE.

No. 880,123.  Specification of Letters Patent.  Patented Feb. 25, 1908.

Application filed May 21, 1907. Serial No. 374,839.

*To all whom it may concern:*

Be it known that I, THOMAS F. BURK, a citizen of the United States, residing at Providence, in the county of Providence, State of Rhode Island, have invented certain new and useful Improvements in Knives; and I do hereby declare the following to be a full, clear, and exact description of the invention, such as will enable others skilled in the art to which it appertains to make and use the same.

This invention relates to knives and more particularly to that class of knives which are designed for slicing and paring fruit and vegetables, the primary object of the invention being to provide a knife embodying means for performing both of these operations.

A further object of the invention is to provide a knife of this class which may be adjusted to cut thick or thin slices and parings.

In carrying out my invention, I employ a knife having the usual form of blade and adjustably fix upon the blade by means of screws, a pair of supplemental blades, one of which has one of its edges lying beyond the sharpened edge of the knife blade proper, and the other of which has its cutting or sharpened edge lying inwardly of the cutting edge of the knife blade proper.

In the accompanying drawings, Figure 1 is a side elevation of a knife embodying my invention, Fig. 2 is a top plan view thereof, and, Fig. 3 is a horizontal sectional view through the blades of the knife taken in a plane with the adjusting screws.

In the drawings there is shown a knife including a handle 5 and a blade 6 having a straight cutting edge 7.

A pair of supplemental blades is adjustably fixed to the blade 6 and one of these blades is indicated by the numeral 8 and the other by the numeral 9. The blade 8 is provided adjacent each of its ends with apertures 10 for the reception of the neck portion 11 of adjusting screws. The neck portions of each of the screws connects a pair of flat heads 12 and 13, between which the supplemental blade 8 is received, the screws being in this manner connected with the said blade 8 for turning movement and being yet prevented from becoming disengaged from the same. Each of these screws has a threaded reception in an aperture 14 formed in the blade 6, and the head 12 of each of the screws is grooved for the engagement of the end of a screw driver whereby the screws may be turned to adjust the blade 8 to and from the blade 6. The blade 8 has its outer edge 15 or rather that longitudinal edge corresponding to the knife edge upon the blade 6 lying beyond the said cutting edge of the blade 6. This blade is used in slicing fruit and vegetables as will be readily understood and guides the blade 6 and also regulates the thickness of the slices.

The blade 9 is similar in construction to the blade 8 and is adjustably connected with the blade 6 by screws 15' which are identical in construction with the screws which connect the blade 8 with the blade 6. The cutting edge of the blade 9, which cutting edge is indicated by the numeral 16, is however positioned inwardly of the cutting edge of the blade 6, and the blades 6 and 9 coöperate in the paring operation.

What is claimed, is:—

1. A knife of the class described comprising a handle, a main blade, and a pair of supplemental blades adjustably fixed upon the main blade, one of the supplemental blades having one of its edges positioned beyond the cutting edge of the main blade.

2. A knife of the class described comprising a handle, a main blade, and a pair of supplemental blades adjustably fixed upon the main blade, one of the supplemental blades having its cutting edges positioned inwardly of the cutting edge of the main blade.

In testimony whereof, I affix my signature, in presence of two witnesses.

THOMAS F. BURK.

Witnesses:
   O. L. HELTZEN,
   CHARLES C. GILBERT.